US009575357B2

(12) United States Patent
Yao et al.

(10) Patent No.: US 9,575,357 B2
(45) Date of Patent: Feb. 21, 2017

(54) LIQUID CRYSTAL DISPLAY PANEL AND FABRICATION METHOD THEREOF

(71) Applicants: Xiamen Tianma Micro-electronics Co., Ltd., Xiamen (CN); Tianma Micro-electronics Co., Ltd., Shenzhen (CN)

(72) Inventors: Shulin Yao, Xiamen (CN); Long Zhang, Xiamen (CN); Ting Zhou, Xiamen (CN); Poping Shen, Xiamen (CN); Zhaokeng Cao, Shanghai (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/985,234

(22) Filed: Dec. 30, 2015

(65) Prior Publication Data

US 2016/0238883 A1  Aug. 18, 2016

(30) Foreign Application Priority Data

Feb. 13, 2015  (CN) .......................... 2015 1 0076699

(51) Int. Cl.
*G02F 1/1335* (2006.01)
*G02F 1/1337* (2006.01)

(52) U.S. Cl.
CPC ... *G02F 1/133528* (2013.01); *G02F 1/133514* (2013.01); *G02F 1/133516* (2013.01); *G02F 1/133533* (2013.01); *G02F 1/133753* (2013.01); *G02F 2001/133538* (2013.01); *G02F 2001/133757* (2013.01)

(58) Field of Classification Search
CPC .............. G02F 2001/133531; G02F 1/133753; G02F 1/133757; G02F 1/133533
See application file for complete search history.

(56) References Cited

U.S. PATENT DOCUMENTS 8,866,997 B2 * 10/2014 Pau ........................ C09K 19/38
349/127
2006/0023143 A1 * 2/2006 Lee ........................ G02B 27/26
349/102

* cited by examiner

*Primary Examiner* — Phu Vu
(74) *Attorney, Agent, or Firm* — Anova Law Group, PLLC (57) ABSTRACT

A liquid crystal display panel includes a first substrate, a second substrate, a liquid crystal layer sandwiched between the first substrate and the second substrate, a color filter having a plurality of first color barriers, second color barriers, and third color barriers. A lower alignment layer is disposed on the first substrate having a plurality of first lower alignment units, second lower alignment units, and third lower alignment units corresponding to the plurality of first color barriers, second color barriers, and third color barriers, respectively. An upper alignment layer is disposed on the second substrate having a plurality of first upper alignment units, second upper alignment units, and third upper alignment units corresponding to the plurality of first color barriers, second color barriers, and third color barriers, respectively. A lower regionalized polarizer is disposed on the first substrate, and an upper regionalized polarizer is disposed on the second substrate.

20 Claims, 9 Drawing Sheets

LIQUID CRYSTAL DISPLAY PANEL AND FABRICATION METHOD THEREOF

CROSS-REFERENCES TO RELATED APPLICATIONS

This application claims the priority of Chinese Patent Application No. CN201510076699.4, filed on Feb. 13, 2015, the entire contents of which are incorporated herein by reference.

FIELD OF THE DISCLOSURE

The present disclosure generally relates to the field of display technologies and, more particularly, relates to a liquid crystal display panel having a regionalized polarizer and a fabrication method thereof.

BACKGROUND

Among various flat panel display devices, thin film transistor liquid crystal displays (TFT-LCD) dominate the mainstream flat penal display market due to their compact size, low power consumption, relatively low manufacturing cost, and zero radiation. A liquid crystal display device mainly includes a liquid crystal display panel and a back light module. The back light module is the light source that provides the light to illuminate the liquid crystal display panel. The light emitted out of the liquid crystal display panel is modulated by the liquid crystal display panel to display images.

The liquid crystal display panel includes a color filter. The light emitted from the back light module passes through the color filter and is mixed together to display various colors. Ideally, the displayed colors reproduce the natural colors as much as possible. Alternatively, the displayed colors are adjusted to approximate the desired colors to satisfy user's requirements and to adapt to the specific application environment of the liquid crystal display panel.

Figure 1:
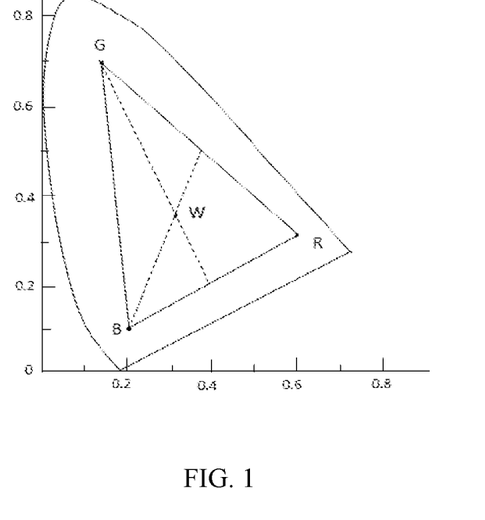
FIG. 1 illustrates a schematic view of a CIE-xy chromaticity diagram.

The white point adjustment is most important for quantitatively processing all natural colors. FIG. 1 illustrates a schematic view of a CIE-xy chromaticity diagram. Referring to FIG. 1, the diagram represents a given color in chromaticity hue and saturation position in the color base coordinate system. Specifically, the XYZ display system has the tristimulus values X, Y, and Z represented in the chromaticity coordinates as the horizontal axis $x=X \div (X+Y+Z)$ and the vertical axis $y=Y \div (X+Y+Z)$. All the colors that can be seen by human eyes are shown in the diagram as the inner portion of the horseshoe shape formed by the closed curve C. The R, G, and B points in the diagram represent the three primary colors, red, green, and blue respectively in a certain color display system. All the colors on the sides of the triangle RGB or inside the triangle RGB may be represented in a proper mixture of the three primary colors. In addition, the white color with the maximum brightness is represented at the point W where all three primary colors reach the maximum brightness. The white color W point is in the vicinity of the triangle RGB centroid.

When designing a color display system, an optimized and requirement satisfying white color point is obtained by adjusting the maximum brightness of the R, G, and B points. In the current technologies, the thicknesses of the red color barriers, green color barriers, and blue color barriers in the color filter are adjusted to optimize the white color point. For example, increasing the thickness of the green color barriers may decrease the light-transmittance of the green color barriers and thereby reduce the maximum brightness of the green light.

However, the method of matching the white color point by adjusting the thicknesses of the color barriers may have certain limitations. For example, after the thicknesses of the color barriers are determined, the brightness of the color barriers cannot be changed. When the color display system has additional special requirement for the white color point, further adjustment of the thicknesses of the color barriers to optimize the white color point may cause substantial differences in the thicknesses of the color barriers and thereby may affect the display effect.

Another drawback of the color barrier thickness adjustment method is that each white color point designed for a certain specification requires a matching color filter with fixed thicknesses of the color barriers. As a result, liquid crystal display panels with different product specifications may need different color filters. The inability of sharing a common color filter across different liquid crystal display panel products may increase the production cost.

The disclosed liquid crystal display panel and fabrication method are directed to solve one or more problems in the art.

BRIEF SUMMARY OF THE DISCLOSURE

Directed to solve one or more problems set forth above and other problems in the art, the present disclosure provides a liquid crystal display panel and a fabrication method to improve image viewing experience.

One aspect of the present disclosure includes a liquid crystal display panel. The liquid crystal display panel includes a first substrate, a second substrate facing toward the first substrate, a liquid crystal layer sandwiched between the first substrate and the second substrate, and a color filter having a plurality of first color barriers, a plurality of second color barriers, and a plurality of third color barriers. A lower alignment layer is disposed on the first substrate having a plurality of first lower alignment units, a plurality of second lower alignment units, and a plurality of third lower alignment units corresponding to the plurality of first color barriers, the plurality of second color barriers, and the plurality of third color barriers, respectively. An upper alignment layer is disposed on the second substrate having a plurality of first upper alignment units, a plurality of second upper alignment units, and a plurality of third upper alignment units corresponding to the plurality of first color barriers, the plurality of second color barriers, and the plurality of third color barriers, respectively. A lower regionalized polarizer is disposed on the first substrate having a plurality of first lower polarizing units, a plurality of second lower polarizing units, and a plurality of third lower polarizing units corresponding to the plurality of first color barriers, the plurality of second color barriers, and the plurality of third color barriers, respectively. And an upper regionalized polarizer is disposed on the second substrate having a plurality of first upper polarizing units, a plurality of second upper polarizing units, and a plurality of third upper polarizing units corresponding to the plurality of first color barriers, the plurality of second color barriers, and the plurality of third color barriers, respectively.

Another aspect of the present disclosure provides a method of fabricating the liquid crystal display panel. The fabrication method includes the following steps. A first substrate is formed. A second substrate is formed facing toward the first substrate. A color filter is formed having a plurality of first color barriers, a plurality of second color barriers, and a plurality of third color barriers. A lower alignment layer is formed on the first substrate having a plurality of first lower alignment units, a plurality of second lower alignment units, and a plurality of third lower alignment units corresponding to the plurality of first color barriers, the plurality of second color barriers, and the plurality of third color barriers, respectively. An upper alignment layer is formed on the second substrate having a plurality of first upper alignment units, a plurality of second upper alignment units, and a plurality of third upper alignment units corresponding to the plurality of first color barriers, the plurality of second color barriers, and the plurality of third color barriers, respectively. A lower regionalized polarizer is formed on the first substrate having a plurality of first lower polarizing units, a plurality of second lower polarizing units, and a plurality of third lower polarizing units corresponding to the plurality of first color barriers, the plurality of second color barriers, and the plurality of third color barriers, respectively. An upper regionalized polarizer is formed on the second substrate having a plurality of first upper polarizing units, a plurality of second upper polarizing units, and a plurality of third upper polarizing units corresponding to the plurality of first color barriers, the plurality of second color barriers, and the plurality of third color barriers, respectively. Liquid crystals are dropped on the second substrate or the first substrate and the second substrate and the first substrate are bonded together to form the liquid crystal display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 2:
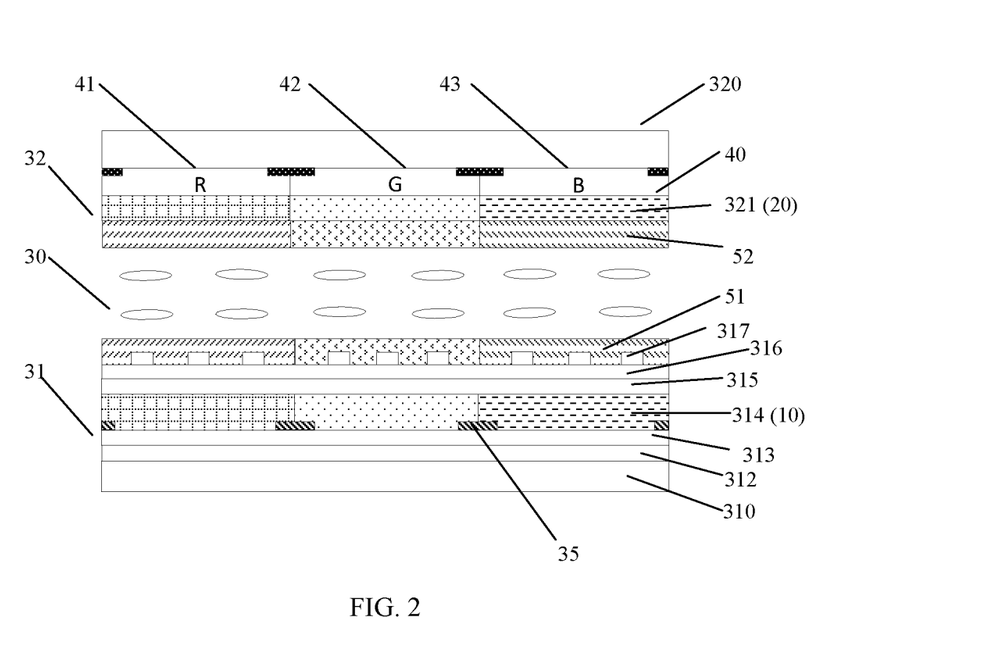
FIG. 2 illustrates a schematic view of an exemplary liquid crystal display panel according to the disclosed embodiments.

FIG. 2 illustrates a schematic view of an exemplary liquid crystal display panel according to the present disclosure. Referring to FIG. 2, the liquid crystal display panel may include a lower substrate 31, an upper substrate 32, and a liquid crystal layer 30 sandwiched between the lower substrate 31 and the upper substrate 32. In one embodiment, the lower substrate 31 may be configured with an actively driven thin film transistor array to form an array substrate. The upper substrate 32 may be configured with a color filter 40 for displaying colors to form a color film substrate.

Specifically, the lower substrate 31 may include a transparent base substrate 310. The transparent base substrate 310 may be sequentially configured with an active layer (not shown), a gate insulating layer 312, and a first insulating layer 313. Data lines 35 may be formed on the first insulating layer 313. A lower planarization layer 314 may be formed on the data lines 35 and the first insulating layer 313. The lower planarization layer 314 may also provide a polarizing function. That is, a lower regionalized polarizer 10 may be formed coplanar with the lower planarization layer 314.

Further, a plurality of first electrodes 315 and second electrodes 317 may be formed on the lower planarization layer 314. The first electrodes 315 and the second electrodes 317 may be separated and insulated by a second insulating layer 316. The second insulating layer 316 may be formed on the first electrodes 315 and the lower planarization layer 314. A lower alignment layer 51 may be formed on the second electrodes 317 and the second insulating layer 316. The lower alignment layer 51 may contact the liquid crystal layer 30. The lower alignment layer 51 may be configured to provide an initial alignment direction to the liquid crystal molecules on the side of liquid crystal layer 30 facing toward the lower substrate 31.

The lower planarization layer 314 may be made of a mixture of one or more of acrylic resin, naphthoquinone diazide ester, 1,4-dioxane, coupling agent, diethylene glycol ethyl methyl ether, and propylene glycol methyl ether acetate, etc. The fluidity of the mixture may be desirable for filling and smoothing the gaps and steps caused by the thickness differences when the gate insulating layer 312 and/or other layers are formed. Thus, the lower planarization layer 314 may have a flat top surface. When the first electrodes 315 are formed on the lower planarization layer 314, the first electrodes 315 may also have flat top surfaces. Subsequently, a uniform distance between the first electrodes 315 and the second electrodes 317 may be obtained to increase the distribution uniformity of the electric field between the first electrodes 315 and the second electrodes 317.

At the same time, the lower planarization layer 314 may be used to reduce the coupling capacitances between the first electrodes 315 and metal lines such as the data lines 35 to improve the display effect of the liquid crystal display panel. Further, the lower planarization layer 314 may be made of an organic film forming material doped with a dichroic organic dye. When the organic film coating process is completed, a lower regionalized polarizer 10 having a plurality of regions with different polarization directions may be formed through an optical alignment process.

Figure 3:
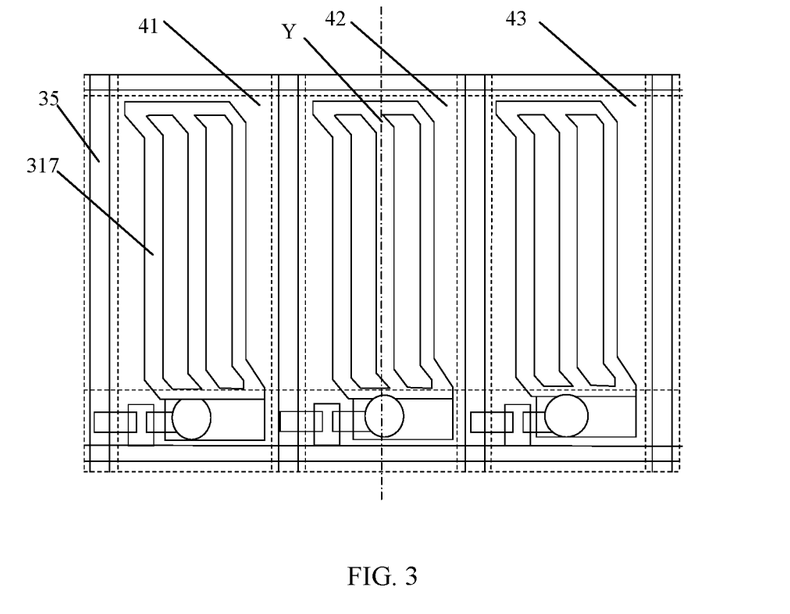
FIG. 3 illustrates a schematic view of an exemplary pixel structure in the liquid crystal display panel according to the disclosed embodiments.

FIG. 3 illustrates a schematic view of an exemplary pixel structure in the liquid crystal display panel according to the present disclosure. In one embodiment, the first electrodes 315 may be common electrodes, and the second electrodes 317 may be pixel electrodes. The second electrodes 317 may be stripe shaped electrodes as shown in FIG. 3. The stripe shaped electrodes may extend in a direction parallel with a first direction Y represented by a dash-dotted line as shown in FIG. 3. The first electrodes 315 and the second electrodes 317 may be used to provide the liquid crystal display panel with a horizontal electric field parallel to the surface of the lower substrate 31 to drive the liquid crystal molecules in the liquid crystal layer 30 to rotate to alter the polarization direction of the incident light passing through the liquid crystal layer 30.

Returning to FIG. 2, the upper substrate 32 may include a transparent base substrate 320. A color filter 40, an upper planarization layer 321, and an upper alignment layer 52 may be formed sequentially on the transparent base substrate 320. The upper planarization layer 321 may provide a polarizing function. That is, an upper regionalized polarizer 20 may be formed coplanar with the upper planarization layer 321. The upper alignment layer 52 may contact the liquid crystal layer 30 to provide an initial alignment direction to the liquid crystal molecules on the side of the liquid crystal layer 30 facing toward the upper substrate 32. The upper alignment layer 52 may have an alignment direction parallel with the alignment direction of the lower alignment layer 51.

As shown in FIG. 3, the color filter 40 may include a plurality of color barriers, corresponding to a plurality of sub-pixel units enclosed by metal lines such as gate lines 35 on the lower substrate 31. In one embodiment, the color filter 40 may include a plurality of first color barriers 41, second color barriers 42, and third color barriers 43 for displaying various colors. The first color barriers 41, the second color barriers 42, and the third color barriers 43 may be arranged alternately and repeatedly in rows on the color filter 40. Color barriers displaying a same color may be arranged in columns on the color filter 40. For example, first color barriers 41 may be arranged in one column, and second color barriers 42 may be arranged in adjacent column.

Figure 4:
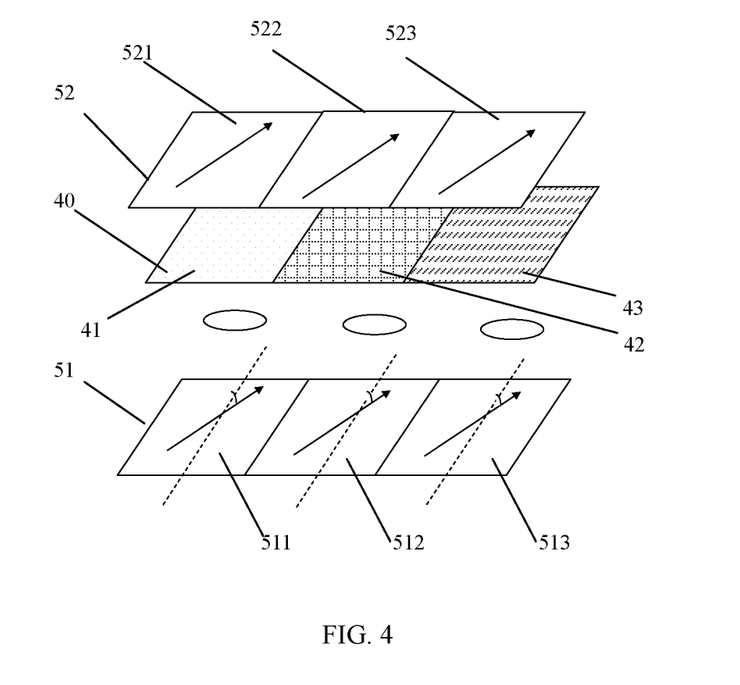
FIG. 4 illustrates a schematic view of an exemplary upper alignment layer and an exemplary lower alignment layer in the liquid crystal display panel according to the disclosed embodiments.
Figure 5:
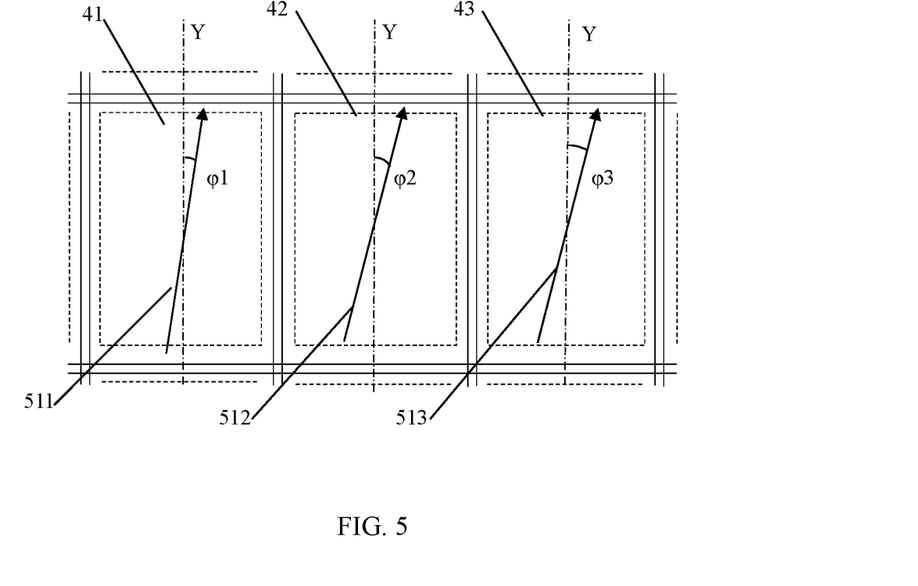
FIG. 5 illustrates a schematic view of angles between alignment directions of the alignment units and the first direction in the liquid crystal display panel according to the present disclosed embodiments.
Figure 6:
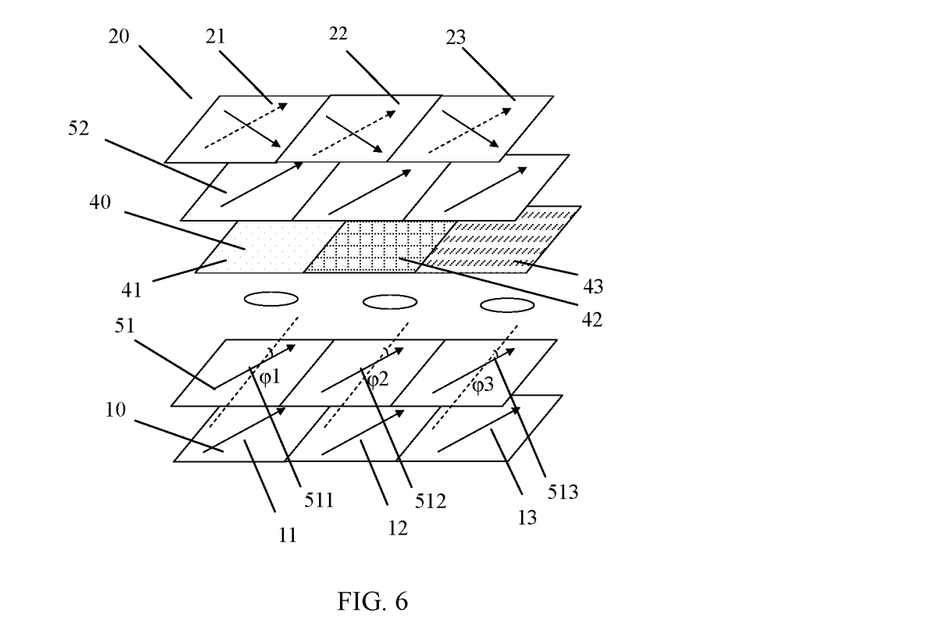
FIG. 6 illustrates a schematic view of the relationships between the polarization directions of the regionalized polarizers and the alignment directions of the alignment layers in the liquid crystal display panel according to the present disclosed embodiments.

The alignment directions of the upper alignment layer 52 and the lower alignment layer 51, and the polarization directions of the upper regionalized polarizer 20 and the lower regionalized polarizer 10 have various configurations illustrated in FIGS. 4-6. Specifically, the liquid crystal display panel may include the lower regionalized polarizer 10, the lower alignment layer 51, the upper alignment layer 52, and the upper regionalized polarizer 20.

FIG. 4 illustrates a schematic view of an exemplary upper alignment layer and an exemplary lower alignment layer in the liquid crystal display panel according to the present disclosure. Referring to FIG. 4, the lower alignment layer 51 may include a first lower alignment unit 511, a second lower alignment unit 512, and a third lower alignment unit 513, corresponding to the first color barrier 41, the second color barrier 42, and the third color barrier 43 of the color filter 40, respectively.

FIG. 5 illustrates a schematic view of angles between alignment directions of the alignment units and the first direction in the liquid crystal display panel according to the present disclosure. Referring to FIG. 5, the first lower alignment unit 511, the second lower alignment unit 512, and the third lower alignment unit 513 may have alignment directions forming a first angle φ1, a second angle φ2, and a third angle φ3 respectively with the first direction Y in which the stripe shaped electrodes 317 extend. In practical product designs, the first angle φ1, the second angle φ2, and the third angle φ3 may be the same or different from each other. The exact values and the relative order of the angles may be determined by the white point requirement of the image displaying of the liquid crystal display panel.

In one embodiment, in order to provide an initial alignment direction to the liquid crystal molecules in the liquid crystal layer 30 and to rotate the liquid crystal molecules to a same direction when being driven by a voltage, the first angle φ1, the second angle φ2, and the third angle φ3 may be controlled in, but are not limited to, certain ranges, for example, $15°≥φ1≥7°$, $15°≥φ2≥7°$, $15°≥φ3≥7°$.

FIG. 6 illustrates a schematic view of the relationships between the polarization directions of the regionalized polarizers and the alignment directions of the alignment layers in the liquid crystal display panel according to the present disclosure. Referring to FIG. 6, the lower regionalized polarizer 10 may include a first lower polarizing unit 11, a second lower polarizing unit 12, and a third lower polarizing unit 13, corresponding to the first color barrier 41, the second color barrier 42, and the third color barrier 43 of the color filter 40, respectively. The first lower polarizing unit 11, the second lower polarizing unit 12, and the third lower polarizing unit 13 may have polarization directions parallel with the alignment directions of the first lower alignment unit 511, the second lower alignment unit 512, and the third lower alignment unit 513, respectively.

The upper alignment layer 52 may include a first upper alignment unit 521, a second upper alignment unit 522, and a third upper alignment unit 523, corresponding to the first color barrier 41, the second color barrier 42, and the third color barrier 43 of the color filter 40, respectively. The first upper alignment unit 521, the second upper alignment unit 522, and the third upper alignment unit 523 may have the alignment directions parallel with the alignment directions of the first lower alignment unit 511, the second lower alignment unit 512, and the third lower alignment unit 513, respectively.

The upper regionalized polarizer 20 may include a first upper polarizing unit 21, a second upper polarizing unit 22, and a third upper polarizing unit 23, corresponding to the first color barrier 41, the second color barrier 42, and the third color barrier 43 of the color filter 40, respectively. The first upper polarizing unit 21, the second upper polarizing unit 22, and the third upper polarizing unit 23 may have polarization directions orthogonal to the polarization directions of the first lower polarizing unit 11, the second lower polarizing unit 12, and the third lower polarizing unit 13, respectively.

In another embodiment, the first lower polarizing unit 11, the second lower polarizing unit 12, and the third lower polarizing unit 13 may have the polarization directions orthogonal to the alignment directions of the first lower alignment unit 511, the second lower alignment unit 512, and the third lower alignment unit 513 respectively. In the meantime, the first upper polarizing unit 21, the second upper polarizing unit 22, and the third upper polarizing unit 23 may have the polarization directions parallel with the alignment directions of the first lower alignment unit 511, the second lower alignment unit 512, and the third lower alignment unit 513, respectively, as long as at least one of the polarization directions of the upper regionalized polarizer 20 and the lower regionalized polarizer 10 is parallel with the alignment directions of the upper alignment layer 52 and the lower alignment layer 51, and the first upper polarizing unit 21, the second upper polarizing unit 22, and the third upper polarizing unit 23 have the polarization directions orthogonal to the polarization directions of the first lower polarizing unit 11, the second lower polarizing unit 12, and the third lower polarizing unit 13, respectively.

Generally, the liquid crystal display panel may have a greater light transmittance when the alignment direction of the alignment layer and the extension direction of the stripe shaped electrodes, i.e., the first direction Y, form a smaller angle. The liquid crystal display panel may have a smaller light transmittance when the alignment direction of the alignment layer and the extension direction of the stripe shaped electrodes, i.e., the first direction Y, form a greater angle. That is, in practical product designs, the angle between the alignment direction and the stripe shaped electrode extension direction, i.e., the first direction Y may be controlled to adjust the light transmittance of the liquid crystal display panel.

In one embodiment, the first angle $\phi 1$, the second angle $\phi 2$, the third angle $\phi 3$ between the alignment directions of the first lower alignment unit 511, the second lower alignment unit 512, and the third lower alignment unit 513 and the stripe shaped electrode extension direction, i.e., the first direction Y may be configured to adjust the light transmittances in the regions corresponding to the first color barrier 41, the second color barrier 42, and the third color barrier 43, and hence to adjust the maximum brightness of the colors corresponding to the first color barrier 41, the second color barrier 42, and the third color barrier 43 to obtain the desired white point.

The exact values and the relative order of the first angle $\phi 1$, the second angle $\phi 2$, and the third angle $\phi 3$ are not limited in the present disclosure, and may be determined based on actual product specifications. In one embodiment, the first angle $\phi 1$ and the third angle $\phi 3$ are equal, and the second angle $\phi 2$ is different from the first angle $\phi 1$. In another embodiment, the first angle $\phi 1$, the second angle $\phi 2$, and the third angle $\phi 3$ are different from each other. In a practical product design, the first angle $\phi 1$, the second angle $\phi 2$, and the third angle $\phi 3$ may be determined based on the desired white point requirement in the product specification.

In one embodiment, the first color barrier 41, the second color barrier 42, and the third color barrier 43 are corresponding to a red color barrier (R), a green color barrier (G), and a blue color barrier (B). For example, based on the customer requirement and/or the application environment of the liquid crystal display panel, the white color point of the liquid crystal display panel may need to be yellowish, i.e., the maximum brightness of the red light and the blue light may be increased. In this case, the third angle $\phi 3$ may remain the same while the first angle $\phi 1$ and the second angle $\phi 2$ may be reduced by a same or different amount. Accordingly, the light transmittances in the regions of the liquid crystal display panel corresponding to the red color barrier (R) and the green color barrier (G) may be increased by a same or different amount, and hence the maximum brightness of the red color light and the green color light may be increased to obtain the desired white color point.

In another embodiment, the white color point of the liquid crystal display panel may need to be purplish. In this case, the second angle $\phi 2$ may remain the same while the first angle $\phi 1$ and the third angle $\phi 3$ may be reduced by a same or different amount. Accordingly, the light transmittances in the regions of the liquid crystal display panel corresponding to the red color barrier (R) and the blue color barrier (B) may be increased by a same or different amount, and hence the maximum brightness of the red color light and the blue color light may be increased to obtain the desired white color point.

Although three colors are used to illustrate the various embodiments, other number of colors may also be used, i.e., various number of color barrier types may be used. Further, although the lower alignment layer is used to configure the first angle $\phi 1$, the second angle $\phi 2$, and the third angle $\phi 3$, the upper alignment layer may also be used to configure the first angle $\phi 1$, the second angle $\phi 2$, and the third angle $\phi 3$. Additionally or optionally, to facilitate the adjustment of the light transmittance of the regions of the color filter coupled by the polarizing regions or units of the regionalized polarizer, the initial values of the first angle $\phi 1$, the second angle $\phi 2$, and the third angle $\phi 3$ may be pre-configured.

In the present disclosure, because the white color point is not adjusted by controlling the thicknesses of color barriers in the conventional method, the desired white color point may be obtained while the flatness of the color filter is maintained to improve the display effect. In the meantime, different color filters are not needed to obtain different white color points based on different product specifications. Thus, the same color filter may be used commonly for various display products and the production cost may be reduced.

In one embodiment, the upper regionalized polarizer 20 and the lower regionalized polarizer 10 may be formed coplanar with the upper planarization layer 321 and the lower planarization layer 314. No additional layers of polarizers may be needed to attach to the upper substrate 32 and the lower substrate 31. The resulting liquid crystal display panel may be thin and low cost.

In other embodiments, the lower regionalized polarizer 10 may not be limited to be formed coplanar with the lower planarization layer 314 on the lower substrate 31. Similarly, the upper regionalized polarizer 20 may not be limited to be formed coplanar with the upper planarization layer 321 on the upper substrate 32. However, the upper regionalized polarizer 20 must be configured on the upper side of the liquid crystal layer 30 and the lower regionalized polarizer 10 must be configured on the lower side of the liquid crystal layer 30.

In one embodiment, the upper regionalized polarizer 20 may be formed as an independent layer on the upper substrate 32. In another embodiment, the lower regionalized polarizer 10 may be formed as an independent layer on the lower substrate 31. In another embodiment, the upper regionalized polarizer 20 and the lower polarizer 10 may be formed as two independent layers on the upper substrate 32 and the lower substrate 31, respectively.

The present disclosure provides a method for fabricating the liquid crystal display panel. The method is illustrated in fabricating the liquid crystal display panel shown in FIG. 2.

The fabrication method according to the present disclosure may include a process for fabricating the lower substrate, a process for fabricating the upper substrate, and a process for dropping liquid crystals and bonding the lower substrate and the upper substrate together.

Figure 8:
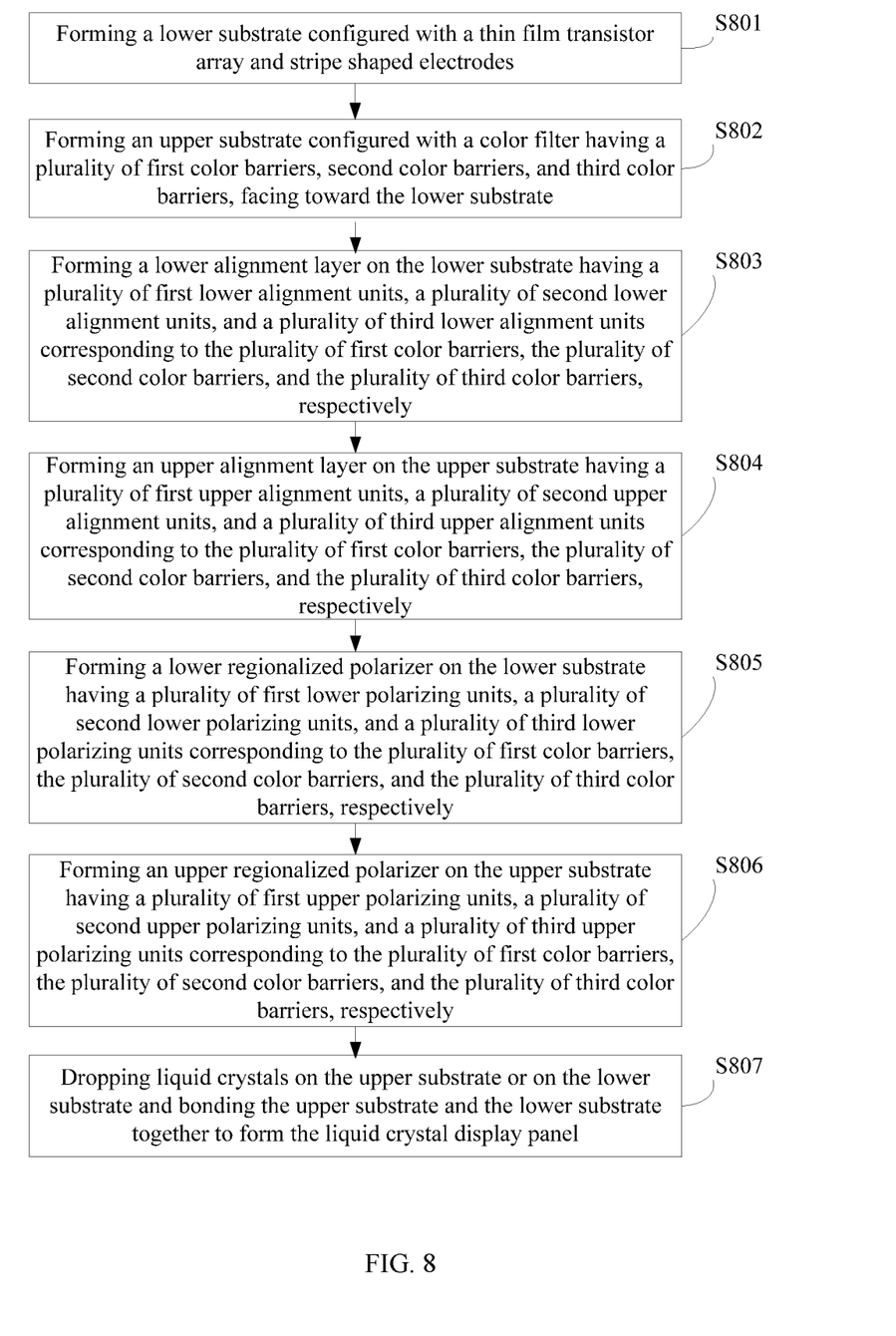
FIG. 8 illustrates an exemplary fabrication process of a liquid crystal display panel according to the disclosed embodiments.

FIG. 8 illustrates an exemplary fabrication process of a liquid crystal display panel according to the present disclosure. Referring to FIG. 8, the fabrication method may include the following steps.

Step S801: forming a lower substrate configured with a thin film transistor array and stripe shaped electrodes.

Specifically, referring to FIG. 2, the lower substrate 31 may include a transparent base substrate 310. The transparent base substrate 310 may be sequentially configured with an active layer, a gate insulating layer 312, and a first insulating layer 313. Data lines 35 may be formed on the first insulating layer 313.

Further, a plurality of first electrodes 315 and second electrodes 317 may be formed on the lower substrate 31. The first electrodes 315 and the second electrodes 317 may be separated and insulated by a second insulating layer 316. The second insulating layer 316 may be formed on the first electrodes 315.

The first electrodes 315 may be common electrodes, and the second electrodes 317 may be pixel electrodes. The second electrodes 317 may be stripe shaped electrodes. The stripe shaped electrodes may extend in a first direction. The first electrodes 315 and the second electrodes 317 may be used to provide the liquid crystal display panel with a horizontal electric field parallel to the surface of the lower substrate 31.

Step S802: forming an upper substrate configured with a color filter having a plurality of first color barriers, second color barriers, and third color barriers, facing toward the lower substrate.

Specifically, referring to FIG. 2, the upper substrate 32 may include a transparent base substrate 320. A color filter 40 may be formed on the upper substrate 32. The color filter may include a plurality of first color barriers 41, second color barriers 42, and third color barriers 43 for displaying various colors.

Step S803: forming a lower alignment layer on the lower substrate having a plurality of first lower alignment units, a plurality of second lower alignment units, and a plurality of third lower alignment units corresponding to the plurality of first color barriers, the plurality of second color barriers, and the plurality of third color barriers, respectively.

Specifically, a lower alignment layer 51 may be formed on the lower substrate 31. The lower alignment layer 51 may include a plurality of first lower alignment units 511, a plurality of second lower alignment units 512, and a plurality of third lower alignment units 513, corresponding to the plurality of first color barriers 41, the plurality of second color barriers 42, and the plurality of third color barriers 43 of the color filter 40, respectively.

The first lower alignment unit 511, the second lower alignment unit 512, and the third lower alignment unit 513 may have alignment directions forming a first angle $\phi 1$, a second angle $\phi 2$, and a third angle $\phi 3$ respectively with the first direction in which the stripe shaped electrodes 317 extend. The first angle $\phi 1$, the second angle $\phi 2$, and the third angle $\phi 3$ may be the same or different from each other. The exact values and the relative order of the angles may be determined by the white point requirement of the image displaying of the liquid crystal display panel. For example, the first angle $\phi 1$, the second angle $\phi 2$, and the third angle $\phi 3$ may be controlled in the ranges, $15° \geq \phi 1 \geq 7°$, $15° \geq \phi 2 \geq 7°$, and $15° \geq \phi 3 \geq 7°$.

Step S804: forming a lower alignment layer on the lower substrate having a plurality of first lower alignment units, a plurality of second lower alignment units, and a plurality of third lower alignment units corresponding to the plurality of first color barriers, the plurality of second color barriers, and the plurality of third color barriers, respectively.

Specifically, an upper alignment layer 52 may be formed on the upper substrate 32. The upper alignment layer 52 may include a plurality of first upper alignment units 521, a plurality of second upper alignment units 522, and a plurality of third upper alignment units 523, corresponding to the plurality of first color barriers 41, the plurality of second color barriers 42, and the plurality of third color barriers 43 of the color filter 40, respectively. The first upper alignment units 521, the second upper alignment units 522, and the third upper alignment units 523 may have the alignment directions parallel with the alignment directions of the first lower alignment units 511, the second lower alignment units 512, and the third lower alignment units 513, respectively.

Step S805: forming a lower regionalized polarizer on the lower substrate having a plurality of first lower polarizing units, a plurality of second lower polarizing units, and a plurality of third lower polarizing units corresponding to the plurality of first color barriers, the plurality of second color barriers, and the plurality of third color barriers, respectively.

Specifically, a lower regionalized polarizer 10 may be formed on the lower substrate 31. The lower regionalized polarizer 10 may include a plurality of first lower polarizing units 11, a plurality of second lower polarizing units 12, and a plurality of third lower polarizing units 13, corresponding to the plurality of first color barriers 41, the plurality of second color barriers 42, and the plurality of third color barriers 43 of the color filter 40, respectively.

The first lower polarizing units 11, the second lower polarizing units 12, and the third lower polarizing units 13 may have polarization directions parallel with the alignment directions of the first lower alignment unit 511, the second lower alignment unit 512, and the third lower alignment unit 513, respectively. Alternatively, the first lower polarizing units 11, the second lower polarizing units 12, and the third lower polarizing units 13 may have polarization directions orthogonal to the alignment directions of the first lower alignment unit 511, the second lower alignment unit 512, and the third lower alignment unit 513, respectively.

Step S806: forming an upper regionalized polarizer on the upper substrate having a plurality of first upper polarizing units, a plurality of second upper polarizing units, and a plurality of third upper polarizing units corresponding to the plurality of first color barriers, the plurality of second color barriers, and the plurality of third color barriers, respectively.

Specifically, an upper regionalized polarizer 20 may be formed on the upper substrate 32. The upper regionalized polarizer 20 may include a plurality of first upper polarizing units 21, a plurality of second upper polarizing units 22, and a plurality of third upper polarizing units 23, corresponding to the plurality of first color barriers 41, the plurality of second color barriers 42, and the plurality of third color barriers 43 of the color filter 40, respectively.

The first upper polarizing units 21, the second upper polarizing units 22, and the third upper polarizing units 23 may have polarization directions orthogonal to the polarization directions of the first lower polarizing units 11, the second lower polarizing units 12, and the third lower polarizing units 13, respectively.

Step S807: dropping liquid crystals on the upper substrate or on the lower substrate and bonding the upper substrate and the lower substrate together to form the liquid crystal display panel.

Further, the liquid crystals may be dropped onto one of the upper substrate 32 or the lower substrate 31, and the upper substrate 32 and the lower substrate 31 may be bonded together to form the liquid crystal display panel. Other processes may also be performed to form other components of the liquid crystal display panel.

Figure 9:
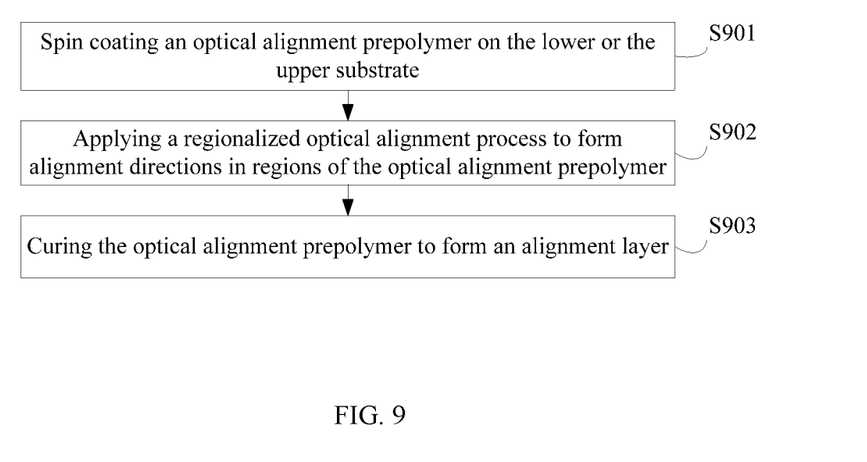
FIG. 9 illustrates an exemplary fabrication process of an alignment layer according to the disclosed embodiments.

Further, the process for fabricating the lower substrate may include forming the lower alignment layer 51 by an optical alignment process. FIG. 9 illustrates an exemplary fabrication process of an alignment layer according to the present disclosure. Referring to FIG. 9, the process for forming the alignment layer may include the following steps. For illustrative purpose, forming a lower alignment layer 51 is described.

Step S901: spin coating an optical alignment prepolymer on the entire substrate. Specifically, the optical alignment prepolymer may be a photosensitive polyimide.

Step S902: applying a regionalized optical alignment process to form alignment directions in regions of the optical alignment prepolymer.

Specifically, a regionalized optical alignment process may be applied to the optical alignment prepolymer to form a lower alignment layer 51. The lower alignment layer 51 may include a first lower alignment unit 511, a second lower alignment unit 512, and a third lower alignment unit 513. The first lower alignment unit 511 corresponds to the first color barrier 41. The second lower alignment unit 512 corresponds to the second color barrier 42. The third lower alignment unit 513 corresponds to the third color barrier 43.

The first lower alignment unit 511, the second lower alignment unit 512, and the third lower alignment unit 513 may have the alignment directions forming the first angle φ, the second angle φ2, and the third angle φ3, respectively with the stripe shaped electrode extension direction, i.e., the first direction Y of the liquid crystal display panel. The exact values and the relative order of the first angle φ, the second angle φ2, and the third angle φ3 may be determined by the white point requirement of the image displaying of the liquid crystal display panel.

In one embodiment, in order to provide an initial alignment direction to the liquid crystal molecules in the liquid crystal layer 30 and to rotate the liquid crystal molecules to a same direction when being driven by a voltage, the first angle φ1, the second angle φ2, and the third angle φ3 may be controlled in, but are not limited to, certain ranges, for example, 15°≥φ1≥7°, 15°≥φ2≥7°, 15°≥φ3≥7°.

In one embodiment, the first color barrier 41, the second color barrier 42, and the third color barrier 43 are corresponding to a red color barrier (R), a green color barrier (G), and a blue color barrier (B).

Step S903: curing the optical alignment prepolymer to form an alignment layer by a high temperature baking. For example, the baking temperature may be approximately 230° C.

Accordingly, the process for fabricating the upper substrate may include forming the upper alignment layer 52 by an optical alignment process. The process for forming the upper alignment layer 52 is the same as the process for forming the lower alignment layer 51, and will not be repeated herein. The upper alignment layer 52 and the lower alignment layer 51 may have the same alignment direction.

Figure 7A:
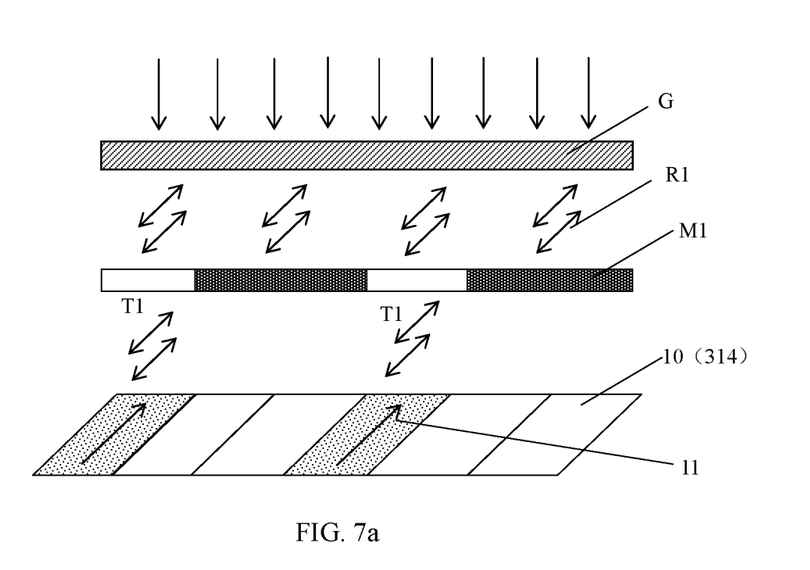
FIG. 7a illustrates a schematic view of an exemplary method of fabricating first polarizing units in a lower regionalized polarizer according to the disclosed embodiments.
Figure 7B:
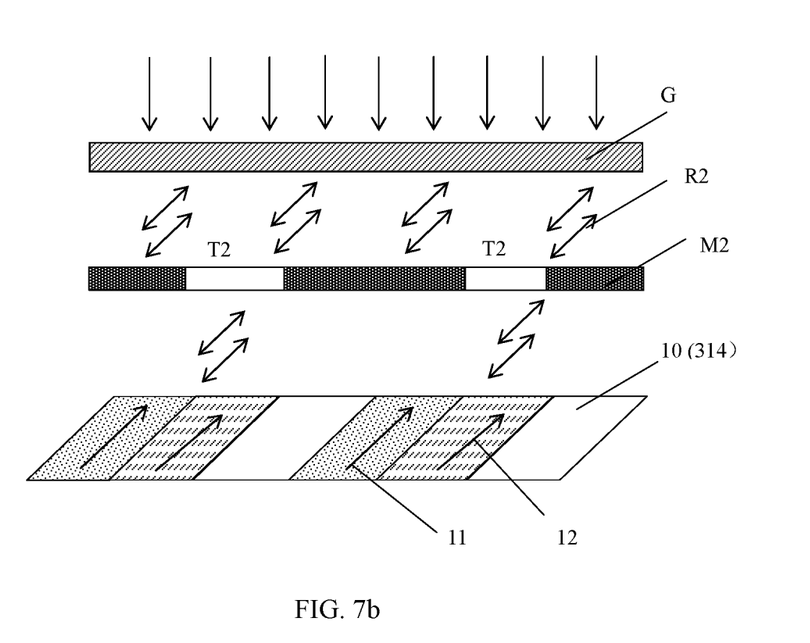
FIG. 7b illustrates a schematic view of an exemplary method of fabricating second polarizing units in the lower regionalized polarizer according to the disclosed embodiments.
Figure 7C:
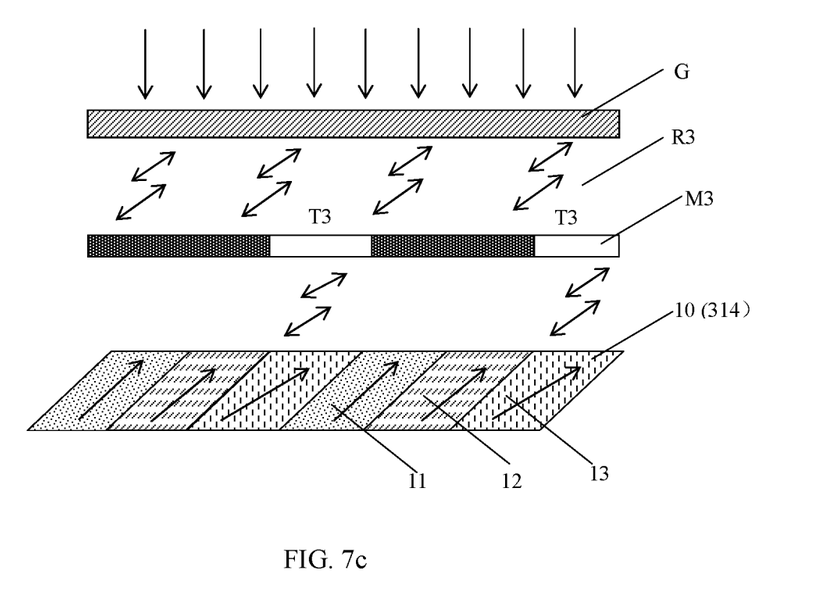
FIG. 7c illustrates a schematic view of an exemplary method of fabricating third polarizing units in the lower regionalized polarizer according to the disclosed embodiments.
Figure 10:
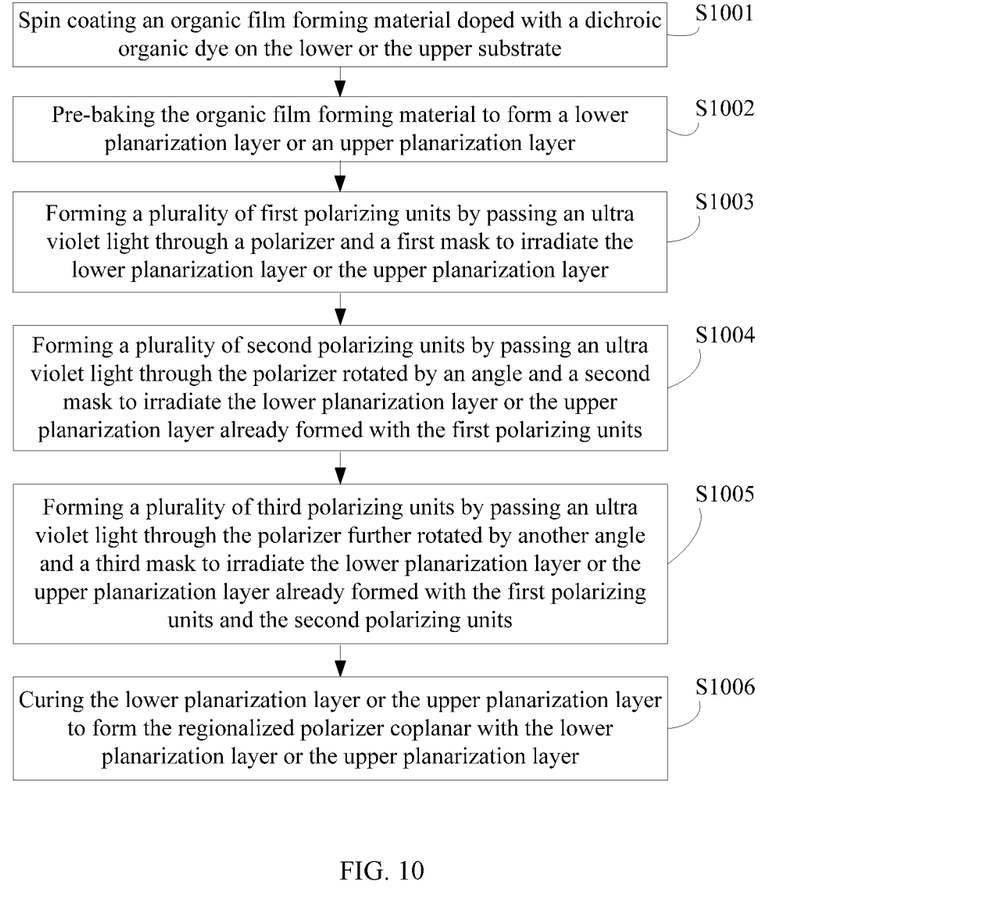
FIG. 10 illustrates an exemplary fabrication process of a regionalized polarizer according to the disclosed embodiments.

Further, the process for fabricating the lower substrate may also include forming the lower planarization layer 314 and the coplanar lower regionalized polarizer 10. FIG. 10 illustrates an exemplary fabrication process of a regionalized polarizer according to the present disclosure. Referring to FIG. 10, the process for forming the lower planarization layer 314 and the coplanar lower regionalized polarizer 10 may include the following steps. FIG. 7a, FIG. 7b, and FIG. 7c illustrate schematic views of various fabrication stages and/or configurations.

Step S1001: spin coating an organic film forming material doped with a dichroic organic dye on the entire substrate.

Specifically, at first, an acrylic resin solution including a mixture of acrylic resin, naphthoquinone diazide ester, 1,4-dioxane, coupling agent, diethylene glycol ethyl methyl ether, and propylene glycol methyl ether acetate may be provided. Then, an optical alignment prepolymer doped with a dichroic organic dye may be mixed in certain proportions with the acrylic resin solution described above to produce an organic film forming material. Next, the organic film forming material may be spin coated over the entire surface of the substrate. Alternatively, the dichroic organic dye may be directly mixed with the acrylic resin solution described above to produce the organic film forming material. In one embodiment, the optical alignment prepolymer may be a photosensitive polyimide, and the dichroic organic dye may be an azo dye.

Step S1002: pre-baking the organic film forming material coated over the entire lower substrate to form a lower planarization layer.

In the process of spin coating and before the process of pre-baking, due to the fluidity characteristics, the acrylic resin solution described above may fill and smooth the gaps and steps caused by the thickness differences when the gate insulating layer 312 and the first insulating layer 313 are formed through a CVD process. After the process of pre-baking, a flat surface lower planarization layer 314 may be obtained.

Step S1003: providing an ultra violet light source emitting an ultra violet light with a wavelength range, for example, approximately between 254 nm and 313 nm, to pass through a polarizer G, for example, a metal grating polarizer to produce a first linearly polarized light R1. Then, the first linearly polarized light R1 may pass through a first mask M1 and may irradiate the lower planarization layer 314.

The first mask M1 may have a light-transmitting portion T1 and the rest of the first mask M1 may be a light-shielding portion. The first linearly polarized light R1 may pass through the light-transmitting portion T1 of the first mask M1 to irradiate the portion of the lower planarization layer 314 that overlaps with the light-transmitting portion T1. The dichroic organic dye in the portion of the lower planarization layer 314 exposed to the first linearly polarized light R1 may be aligned to a certain polarization direction. Thus, the first lower polarizing units 11 may be formed, as show in FIG. 7a. The first lower polarizing units 11 may have a polarization direction parallel with the alignment direction of the first lower alignment units 511. Further, referring to FIG. 7a, the plurality of first lower polarizing units 11 may be formed coplanar with the lower planarization layer 314.

Step S1004: adjusting the relative position between the polarizer G and the substrate formed with the first lower polarizing units 11 on the lower planarization player 314 by horizontally rotating the substrate by an angle, or horizontally rotating the polarizer G by an angle without changing the substrate position, and replacing the first mask M1 with a second mask M2 between the polarizer G and the lower planarization layer 314.

The second mask M2 may have a light-transmitting portion T2 and the rest of the second mask M2 may be a light-shielding portion. A second linearly polarized light R2 may be produced after the ultra violet light passes through the polarizer G. The second linearly polarized light R2 may pass through the light-transmitting portion T2 of the second mask M2 to irradiate the portion of the lower planarization layer 314 that overlaps with the light-transmitting portion T2. The dichroic organic dye in the portion of the lower planarization layer 314 exposed to the second linearly polarized light R2 may be aligned to a different polarization direction. Thus, second lower polarizing units 12 may be formed, as shown in FIG. 7b. The second lower polarizing units 12 may have a polarization direction parallel with the alignment direction of the second lower alignment units 512. Further, referring to FIG. 7b, the plurality of second lower polarizing units 12 may be formed coplanar with the lower planarization layer 314 already formed with the first lower polarizing units 11.

Step S1005: further adjusting the relative position between the polarizer G and the substrate formed with the first lower polarizing units 11 and the second lower polarizing units 12 on the lower planarization player 314 by horizontally rotating the substrate by another angle, or horizontally rotating the polarizer G by another angle without changing the substrate position, and replacing the second mask M2 with a third mask M3 between the polarizer G and the lower planarization layer 314.

The third mask M3 may have a light-transmitting portion T3 and the rest of the second mask M3 may be a light-shielding portion. A third linearly polarized light R3 may be produced after the ultra violet light passes through the polarizer G. The third linearly polarized light R3 may pass through the light-transmitting portion T3 of the third mask M3 to irradiate the portion of the lower planarization layer 314 that overlaps with the light-transmitting portion T3. The dichroic organic dye in the portion of the lower planarization layer 314 exposed to the third linearly polarized light R3 may be aligned to another different polarization direction. Thus, third lower polarizing units 13 may be formed, as shown in FIG. 7c. The third lower polarizing units 13 may have a polarization direction parallel with the alignment direction of the third lower alignment units 513. Further, referring to FIG. 7c, the plurality of third lower polarizing units 13 may be formed coplanar with the lower planarization layer 314 already formed with the first lower polarizing units 11 and the second lower polarizing units 12.

Step S1006: curing the lower planarization layer 314 formed with the lower polarizing units by performing a second high temperature baking. For example, the second baking may have a high temperature approximately at 230° C. The curing may enhance the anisotropy feature of the first lower polarizing units 11, the second lower polarizing units 12, and the third lower polarizing units 13. Thus, a lower regionalized polarizer 10 may be formed coplanar with the lower planarization layer 314.

Further, the process for fabricating the upper substrate may also include forming the upper planarization layer 321 and the coplanar upper regionalized polarizer 20. The process for forming the upper planarization layer 321 and the coplanar upper regionalized polarizer 20 may be similar to the process for forming the lower planarization layer 314 and the coplanar lower regionalized polarizer 10, and will not be repeated herein.

The fabrication methods disclosed above may be used to fabricate the liquid crystal display panel shown in FIG. 2.

In addition, the present disclosure provides another method of fabricating the liquid crystal display panel. In this case, the upper regionalized polarizer 20 and the lower regionalized polarizer 10 may be formed as two independent layers rather than being coplanar with any existing layer in the upper substrate 32 or the lower substrate 31. In addition, the fabrication method according to the present disclosure may include a process for fabricating the lower substrate, a process for fabricating the upper substrate, and a process for dropping liquid crystals and bonding the lower substrate and the upper substrate together.

Figure 11:
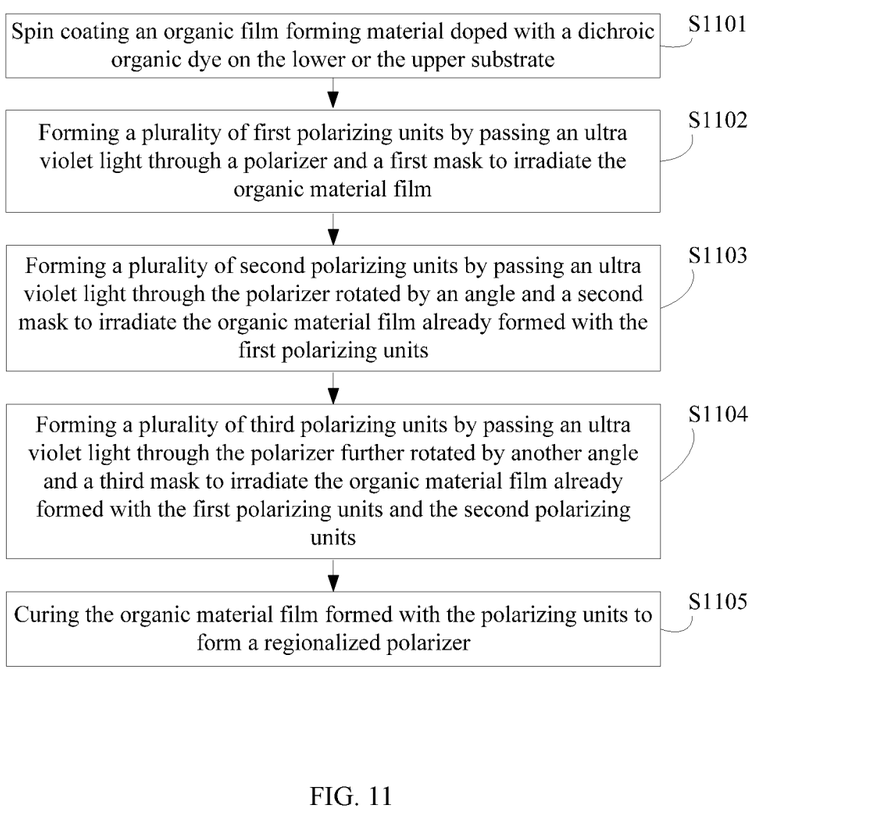
FIG. 11 illustrates another exemplary fabrication process of a regionalized polarizer according to the disclosed embodiments.

FIG. 11 illustrates another exemplary fabrication process of a regionalized polarizer according to the present disclosure. Referring to FIG. 11, the process for fabricating the lower regionalized polarizer 10 on the lower substrate 31 is described for the illustrative purpose. The process for fabricating the lower regionalized polarizer 10 on the lower substrate 31 may include the following steps. FIG. 7a, FIG. 7b, and FIG. 7c illustrate schematic views of various fabrication stages and/or configurations.

Step S1101: spin coating an organic film forming material doped with a dichroic organic dye on the entire lower substrate.

Specifically, in one embodiment, the organic film forming material may be a photosensitive polyimide, and the dichroic organic dye may be an azo dye.

Step S1102: providing an ultra violet light source emitting an ultra violet light with a wavelength range, for example, approximately between 254 nm and 313 nm, to pass through a polarizer G, for example, a metal grating polarizer to produce a first linearly polarized light R1. Then, the first linearly polarized light R1 may pass through a first mask M1 and may irradiate the organic material film.

The first mask M1 may have a light-transmitting portion T1 and the rest of the first mask M1 may be a light-shielding portion. The first linearly polarized light R1 may pass through the light-transmitting portion T1 of the first mask M1 to irradiate the portion of the organic material film that overlaps with the light-transmitting portion T1. The dichroic organic dye in the portion of the organic material film exposed to the first linearly polarized light R1 may be aligned to a certain polarization direction. Thus, the first lower polarizing units 11 may be formed, as shown in FIG. 7a. The first lower polarizing units 11 correspond to the first lower alignment units 511. The first lower polarizing units 11 may have a polarization direction parallel with the alignment direction of the first lower alignment units 511. Referring to FIG. 7a, the plurality of first lower polarizing units 11 may be formed on the lower substrate.

Step S1103: adjusting the relative position between the polarizer G and the substrate formed with the first lower polarizing units 11 by horizontally rotating the substrate by an angle, or horizontally rotating the polarizer G by an angle without changing the substrate position, and replacing the first mask M1 with a second mask M2 between the polarizer G and the organic material film.

The second mask M2 may have a light-transmitting portion T2 and the rest of the second mask M2 may be a light-shielding portion. A second linearly polarized light R2 may be produced after the ultra violet light passes through the polarizer G. The second linearly polarized light R2 may pass through the light-transmitting portion T2 of the second mask M2 to irradiate the portion of the organic material film that overlaps with the light-transmitting portion T2. The dichroic organic dye in the portion of the organic material film exposed to the second linearly polarized light R2 may be aligned to a different polarization direction. Thus, second lower polarizing units 12 may be formed, as shown in FIG. 7b. The second lower polarizing units 12 correspond to the second lower alignment unit 512. The second lower polarizing units 12 may have a polarization direction parallel with the alignment direction of the second lower alignment units 512. Referring to FIG. 7b, the plurality of second lower polarizing units 12 may be formed on the lower substrate already formed with the first lower polarizing units 11.

Step S1104: further adjusting the relative position between the polarizer G and the substrate formed with the first lower polarizing units 11 and the second lower polarizing units 12 by horizontally rotating the substrate by another angle, or horizontally rotating the polarizer G by another angle without changing the substrate position, and replacing the second mask M2 with a third mask M3 between the polarizer G and the organic material film.

The third mask M3 may have a light-transmitting portion T3 and the rest of the second mask M3 may be a light-shielding portion. A third linearly polarized light R3 may be produced after the ultra violet light passes through the polarizer G. The third linearly polarized light R3 may pass through the light-transmitting portion T3 of the third mask M3 to irradiate the portion of the organic material film that overlaps with the light-transmitting portion T3. The dichroic organic dye in the portion of the organic material film exposed to the third linearly polarized light R3 may be aligned to another different polarization direction. Thus, third lower polarizing units 13 may be formed, as shown in FIG. 7c. The third lower polarizing units 13 correspond to the third lower alignment units 513. The third lower polarizing units 13 may have a polarization direction parallel with the alignment direction of the third lower alignment units 513. Referring to FIG. 7c, the plurality of third lower polarizing units 13 may be formed on the lower substrate already formed with the first lower polarizing units 11 and the second lower polarizing units 12.

Step S1105: curing the organic material film formed with the polarizing units by performing a high temperature baking. For example, the baking may have a high temperature approximately at 230°. The curing may enhance the anisotropy feature of the first lower polarizing units 11, the second lower polarizing units 12, and the third lower polarizing units 13. Thus, a lower regionalized polarizer 10 may be formed.

Further, the process for fabricating the upper substrate may also include forming the upper regionalized polarizer 20. The process for forming the upper regionalized polarizer 20 may be similar to the process for forming the lower regionalized polarizer 10, and will not be repeated herein.

In one embodiment, the first color barriers 41, the second color barriers 422, and the third color barriers 43 may be red color barriers, green color barriers, and blue color barriers, respectively.

The fabrication methods described above may be used to fabricate the liquid crystal display panel that includes stripe shaped electrodes, the alignment layers, and the regionalized polarizers. The angles between the alignment directions of the alignment layers and the stripe shaped electrode extension direction may be adjusted to adjust the light transmittances in the regions corresponding to the certain color barriers to obtain the white color point satisfying the product specification of the liquid crystal display panel.

The liquid crystal display panel according to the present disclosure may include the regionalized polarizers, the alignment layers, and the stripe shaped electrodes. The alignment layers may include the first alignment units, the second alignment units, and the third alignment units corresponding to the red color barriers, the green color barriers, and the blue color barriers, respectively. The alignment directions of the first alignment units, the second alignment units, and the third alignment units may form the first angle, the second angle, and the third angle, respectively with the stripe shaped electrode extension direction.

Because the polarization directions of the regionalized polarizers may align with the alignment directions of the alignment layers, the values and the relative order of the first angle, the second angle, and the third angle may be adjusted to adjust the light transmittances in the regions of the liquid crystal display panel corresponding to the first color barriers, the second color barriers, and the third color barriers of the liquid crystal display panel, and hence to adjust the maximum brightness of the colors corresponding to the first color barriers, the second color barriers, and the third color barriers. Thus, the desired white color point may be obtained in the liquid crystal display panel to satisfy the display product specification.

Because the white color point is not adjusted by controlling the thicknesses of color barriers, the desired white color point may be obtained while the flatness of the color filter is maintained to improve the display effect. In the meantime, different color filters are not needed to obtain different white color points based on different product specifications. Thus, the same color filter may be used commonly for various display products and the production cost may be reduced.

The specification above provides detailed descriptions of the liquid crystal display panel and the fabrication method according to the present disclosure. Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:
1. An liquid crystal display panel, comprising:
a first substrate;
a second substrate facing toward the first substrate;
a liquid crystal layer sandwiched between the first substrate and the second substrate;
a color filter having a plurality of first color barriers, a plurality of second color barriers, and a plurality of third color barriers;
a lower alignment layer disposed on the first substrate having a plurality of first lower alignment units, a plurality of second lower alignment units, and a plurality of third lower alignment units corresponding to the plurality of first color barriers, the plurality of second color barriers, and the plurality of third color barriers, respectively;
an upper alignment layer disposed on the second substrate having a plurality of first upper alignment units, a plurality of second upper alignment units, and a plurality of third upper alignment units corresponding to the plurality of first color barriers, the plurality of second color barriers, and the plurality of third color barriers, respectively;
a lower regionalized polarizer disposed on the first substrate having a plurality of first lower polarizing units, a plurality of second lower polarizing units, and a plurality of third lower polarizing units corresponding to the plurality of first color barrier, the plurality of second color barriers, and the plurality of third color barriers, respectively; and an upper regionalized polarizer disposed on the second substrate having a plurality of first upper polarizing units, a plurality of second upper polarizing units, and a plurality of third upper polarizing units corresponding to the plurality of first color barriers, the plurality of second color barriers, and the plurality of third color barriers, respectively.

2. The liquid crystal display panel of claim 1, wherein:
the first substrate is configured with a thin film transistor array and stripe shaped electrodes; and
the color filter is configured on the second substrate.

3. The liquid crystal display panel of claim 2, wherein:
the stripe shaped electrodes extend in a first direction;
the first lower alignment units, the second lower alignment units, and the third lower alignment units form a first angle $\phi1$, a second angle $\phi2$, and a third angle $\phi3$, respectively with the first direction;
the first upper alignment units, the second upper alignment units, and the third upper alignment units have same alignment directions as the first lower alignment units, the second lower alignment units, and the third lower alignment units, respectively;
the first lower polarizing units, the second lower polarizing units, and the third lower polarizing units have polarization directions parallel with or orthogonal to the alignment directions of the first lower alignment units, the second lower alignment units, and the third lower alignment units, respectively; and
the first upper polarizing units, the second upper polarizing units, and the third upper polarizing units have polarization directions orthogonal to the polarization directions of the first lower polarizing units, the second lower polarizing units, and the third lower polarizing units, respectively.

4. The liquid crystal display panel of claim 3, wherein:
the first angle, the second angle, and the third angle are configured to adjust the light transmittances in regions of the liquid crystal display panel corresponding to the first color barriers, the second color barriers, and the third color barriers, respectively.

5. The liquid crystal display panel of claim 1, wherein:
the light transmittances in the regions of the liquid crystal display panel corresponding to the first color barriers, the second color barriers, and the third color barriers correspond to maximum brightness of light emitting from the first color barriers, the second color barriers, and the third color barriers, respectively.

6. The liquid crystal display panel of claim 1, wherein:
the first color barriers, the second color barriers, and the third color barriers are red color barriers, green color barriers, and blue color barriers respectively.

7. The liquid crystal display panel of claim 3, wherein:
the first angle $\phi1$ is equal to the third angle $\phi3$, and the second angle $\phi2$ is different from the first angle $\phi1$ and the third angle $\phi3$.

8. The liquid crystal display panel of claim 3, wherein:
the first angle $\phi1$, the second angle $\phi2$, and the third angle $\phi3$ are different from each other.

9. The liquid crystal display panel of claim 3, wherein:
$15°\geq\phi1\geq7°$, $15°\geq\phi2\geq7°$, and $15°\geq\phi3\geq7°$.

10. The liquid crystal display panel of claim 3, further including:

an upper planarization layer formed on the color filter, wherein the upper regionalized polarizer is configured coplanar with the upper planarization layer.

11. The liquid crystal display panel of claim 3, further including:
a lower planarization layer formed on the first substrate; and
first electrodes formed on the lower planarization layer, wherein:
the stripe shaped electrodes are formed on the first electrodes;
the stripe shaped electrodes and the first electrodes are insulated by a second insulating layer;
a horizontal electric field is formed between the stripe shaped electrodes and the first electrodes; and
the lower regionalized polarizer is configured coplanar with the lower planarization layer.

12. The liquid crystal display panel of claim 3, wherein:
the upper regionalized polarizer and the lower regionalized polarizer are formed as two independent layers on the second substrate and the first substrate, respectively.

13. A method of fabricating the liquid crystal display panel, comprising:
forming a first substrate;
forming a second substrate facing toward the first substrate;
forming a color filter having a plurality of first color barriers, a plurality of second color barriers, and a plurality of third color barriers;
forming a lower alignment layer on the first substrate having a plurality of first lower alignment units, a plurality of second lower alignment units, and a plurality of third lower alignment units corresponding to the plurality of first color barriers, the plurality of second color barriers, and the plurality of third color barriers, respectively;
forming an upper alignment layer on the second substrate having a plurality of first upper alignment units, a plurality of second upper alignment units, and a plurality of third upper alignment units corresponding to the plurality of first color barriers, the plurality of second color barriers, and the plurality of third color barriers, respectively;
forming a lower regionalized polarizer on the first substrate having a plurality of first lower polarizing units, a plurality of second lower polarizing units, and a plurality of third lower polarizing units corresponding to the plurality of first color barriers, the plurality of second color barriers, and the plurality of third color barriers, respectively;
forming an upper regionalized polarizer on the second substrate having a plurality of first upper polarizing units, a plurality of second upper polarizing units, and a plurality of third upper polarizing units corresponding to the plurality of first color barriers, the plurality of second color barriers, and the plurality of third color barriers, respectively; and
dropping liquid crystals on the second substrate or the first substrate and bonding the second substrate and the first substrate together to form the liquid crystal display panel.

14. The fabrication method of claim 13, wherein:
the first substrate is configured with a thin film transistor array and stripe shaped electrodes; and
the color filter is configured on the second substrate.

15. The fabrication method claim 14, wherein:
the stripe shaped electrodes extend in a first direction;

the first lower alignment units, the second lower alignment units, and the third lower alignment units form a first angle φ1, a second angle φ2, and a third angle φ3, respectively with the first direction;

the first upper alignment units, the second upper alignment units, and the third upper alignment units have same alignment directions as the first lower alignment units, the second lower alignment units, and the third lower alignment units, respectively;

the first lower polarizing units, the second lower polarizing units, and the third lower polarizing units have polarization directions parallel with or orthogonal to the alignment directions of the first lower alignment units, the second lower alignment units, and the third lower alignment units, respectively; and the first upper polarizing units, the second upper polarizing units, and the third upper polarizing units have polarization directions orthogonal to the polarization directions of the first lower polarizing units, the second lower polarizing units, and the third lower polarizing units, respectively.

16. The fabrication method of claim 15, wherein forming the alignment layer includes:

spin coating an optical alignment prepolymer on the first or the second substrate;

applying a regionalized optical alignment process to form alignment directions in regions of the optical alignment prepolymer; and curing the optical alignment prepolymer to form an alignment layer.

17. The fabrication method of claim 15, wherein forming the regionalized polarizer includes:

spin coating an organic film forming material doped with a dichroic organic dye on the first substrate or the second substrate;

forming a plurality of first polarizing units by passing an ultra violet light through a polarizer and a first mask to irradiate the organic material film;

forming a plurality of second polarizing units by passing an ultra violet light through the polarizer rotated by an angle and a second mask to irradiate the organic material film already formed with the first polarizing units;

forming a plurality of third polarizing units by passing an ultra violet light through the polarizer further rotated by another angle and a third mask to irradiate the organic material film already formed with the first polarizing units and the second polarizing units; and curing the organic material film formed with the polarizing units by a high temperature baking with a baking temperature approximately at 230° C. to form the regionalized polarizer.

18. The fabrication method of claim 17, wherein:

the organic film forming material is a photosensitive polyimide, and the dichroic organic dye is an azo dye.

19. The method of fabricating the liquid crystal display panel of claim 15, wherein forming the regionalized polarizer includes:

spin coating an organic film forming material doped with a dichroic organic dye on the first substrate or the second substrate;

pre-baking the organic film forming material to form a lower planarization layer or an upper planarization layer;

forming a plurality of first polarizing units by passing an ultra violet light through a polarizer and a first mask to irradiate the lower planarization layer or the upper planarization layer;

forming a plurality of second polarizing units by passing an ultra violet light through the polarizer rotated by an angle and a second mask to irradiate the lower planarization layer or the upper planarization layer already formed with the first polarizing units;

forming a plurality of third polarizing units by passing an ultra violet light through the polarizer further rotated by another angle and a third mask to irradiate the lower planarization layer or the upper planarization layer already formed with the first polarizing units and the second polarizing units; and curing the lower planarization layer or the upper planarization layer by a high temperature baking with a baking temperature approximately at 230° C. to form the regionalized polarizer coplanar with the lower planarization layer or the upper planarization layer.

20. The fabrication method of claim 19, wherein:

the organic film forming material includes a photosensitive polyimide and a dichroic organic dye mixed with an acrylic resin solution in a certain proportion;

the dichroic organic dye is an azo dye; and the acrylic resin solution is a mixture of acrylic resin, naphthoquinone diazide ester, 1,4-dioxane, coupling agent, diethylene glycol ethyl methyl ether, and propylene glycol methyl ether acetate, etc.

* * * * *